US008285057B2

(12) United States Patent
Sarkar

(10) Patent No.: US 8,285,057 B2
(45) Date of Patent: *Oct. 9, 2012

(54) LEARNING IMAGE ANCHOR TEMPLATES FOR DOCUMENT CLASSIFICATION

(75) Inventor: Prateek Sarkar, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 12/780,317

(22) Filed: May 14, 2010

(65) Prior Publication Data

US 2011/0280451 A1  Nov. 17, 2011

(51) Int. Cl.
*G06K 9/62* (2006.01)
*G06K 9/00* (2006.01)

(52) U.S. Cl. ........................................ 382/209; 382/224

(58) Field of Classification Search .................. 382/112, 382/155, 157, 159, 161, 187, 209, 215, 218, 382/224, 225, 228; 715/243, 246, 253; 706/12
See application file for complete search history.

(56) References Cited

U.S. PATENT DOCUMENTS

| | | | | |
|---|---|---|---|---|
| 5,077,805 A | * | 12/1991 | Tan | 382/137 |
| 5,222,155 A | * | 6/1993 | Delanoy et al. | 382/215 |
| 5,594,809 A | * | 1/1997 | Kopec et al. | 382/161 |
| 5,978,495 A | * | 11/1999 | Thomopoulos et al. | 382/124 |
| 6,259,815 B1 | * | 7/2001 | Anderson et al. | 382/218 |
| 6,741,738 B2 | | 5/2004 | Taylor | |
| 6,778,703 B1 | * | 8/2004 | Zlotnick | 382/218 |
| 8,086,039 B2 | | 12/2011 | Kletter | |
| 8,144,947 B2 | | 3/2012 | Kletter | |
| 2004/0133536 A1 | | 7/2004 | Uceda-Sosa | |
| 2007/0165904 A1 | | 7/2007 | Nudd et al. | |
| 2008/0022197 A1 | * | 1/2008 | Bargeron et al. | 715/246 |
| 2009/0324100 A1 | | 12/2009 | Kletter et al. | |
| 2011/0280451 A1 | * | 11/2011 | Sarkar | 382/112 |
| 2011/0280490 A1 | * | 11/2011 | Sarkar | 382/209 |

OTHER PUBLICATIONS

Amit, Yali, et al., Shape Quantization and Recognition with Randomized Trees, Neural Computation, 9(7): 1545-1588, Oct. 1997.
Huttenlocher, Daniel P., et al., A Multi-Resolution Technique for Comparing Images Using the Hausdorff Distance, TR 92-1321,Cornell University, Dec. 1992.
Jung, Dz-Mou, et al., N-Tuple Features for OCR Revisited, IEEE Transactions on Pattern Analysis and Machine Intelligence, 18(7): 734-745, Jul. 1996.
Rucklidge, William, Efficient Visual Recognition Using the Hausdorff Distance, Springer-Verlag New York, Inc., Secaucus, NJ, 1996.

(Continued)

*Primary Examiner* — Amir Alavi
(74) *Attorney, Agent, or Firm* — Fay Sharpe LLP

(57) ABSTRACT

Methods, and corresponding systems, of generating one or more image anchor templates for discriminating between documents of a first class and documents of other classes are provided. The methods include generating one or more candidate image anchor templates; determining, using a computer processor, a quality score for each of the one or more candidate image anchor templates; ranking the one or more candidate image anchor templates according to the quality scores of the one or more candidate image anchor templates; and selecting one or more of the most highly ranked image anchor templates.

20 Claims, 9 Drawing Sheets

OTHER PUBLICATIONS

Sarkar, Prateek, Image Classification: Classifying Distributions of Visual Features, The 18th International Conference on Pattern Recognition, Hong Kong, pp. 1-4, IEEE, 2006.

Spitz, Lawrence, Shape-based Word Recognition, International Journal on Document Analysis and Recognition, 1(4): 178-190, Springer-Verlag, May 1999.

Yuille, Alan L., et al., Feature Extraction from Faces Using Deformable Templates, Computer Vision and Pattern Recognition, Harvard Robotics Laboratory Division of Applied Sciences, Harvard University, pp. 104-109, IEEE 1989.

Brunelli, Roerto, Template Matching Techniques in Computer Vision, Wiley (UK), 2009.

* cited by examiner

PTO/SB/03A (07-07)
Approved for use through 08/30/2010 OMB 0851-0032
U.S. Patent and Trademark Office; U.S. DEPARTMENT OF COMMERCE
Under the Paperwork Reduction Act of 1995, no persons are required to respond to a collection of information unless it displays a valid OMB control number.

100

DECLARATION (37 CFR 1.63) FOR PLANT APPLICATION USING AN APPLICATION DATA SHEET (37 CFR 1.76)

| Title of Invention | |
|---|---|

As the below named inventor(s), I/we declare that:

This declaration is directed to:

☐ The attached application, or

☐ Application No. _____ filed on _____

☐ as amended on _____ (if application);

I/we believe that I/we am/are the original and first inventor(s) of the new and distinct variety of plant which is claimed and for which a plant patent is sought;

I/we have asexually reproduced the plant to which this application applies;

☐ The plant was found in a cultivated area (check this box for a newly found plant only);

FROM FIG. 1A

106 — I/we have reviewed and understand the contents of the above-identified application, including the claims, as amended by any amendment specifically referred to above;

102 — I/we acknowledge the duty to disclosure to the United State Patent and Trademark Office all information known to me/us to be material to patentability as defined in 37 CFR 1.56, including for continuation-in-part applications, material information which became available between the filing date of the prior application and the national or PCT International filing date of the 104 — continuation-in-part.

WARNING:
Petitioner/applicant is cautioned to avoid submitting personal information in documents filed in a patent application that may contribute to identity theft. Personal information such as social security numbers, bank account numbers, or credit card numbers (other than a check or credit card authorization form PTO-2038 submitted for payment purposes) is never required by the USPTO to support a petition or an application. If this type of personal information is included in documents submitted to the USPTO, petitioners/applicants should consider redacting such personal information from the documents before submitting them to the USPTO. Petitioner/applicant is advised that the record of a patent application is available to the public after publication of the application (unless a non-publication request in compliance with 37 CFR 1.213(a) is made in the application) or issuance of a patent. Furthermore, the record from an abandoned application may also be available to the public if the application is referenced in a published application or an issued patent (see 37 CFR 1.14). Checks and credit card authorization forms PTO-2038 submitted for payment purposes are not retained in the application file and therefore are not publicly available.

All statements made herein of my/our own knowledge are true, all statements made herein on information and belief are believed to be true, and further that these statements were made with the knowledge that willful false statements and the like are punishable by fine or imprisonment, or both, under 18 U.S.C. 1001, and may jeopardize the validity of the application or any patent issuing thereon.

FULL NAME OF INVENTOR(S)

Inventor one: _____ Date: _____

Signature: _____ Citizen of: _____

☐ Additional inventors or a legal representative are being named on _____ additional form(s) attached hereto.

This collection of information is required by 37 U.S.C. 115 and 37 CFR 1.63. The information is required to obtain or retain a benefit by the public which is to file (and by the USPTO to process) an application. Confidentiality is governed by 35 U.S.C. 122 and 37 CFR 1.11 and 1.14. This collection is estimated to take 2 minutes to complete, including gathering, preparing, and submitting the completed application form to the USPTO. Time will vary depending upon the individual case. Any comments on the amount of time you require to complete this form and/or suggestions for reducing this burden, should be sent to the Chief Information Officer, U.S. Patent and Trademark Office, U.S. Department of Commerce, P.O. Box 1450, Alexandria, VA 22313-1450. DO NOT SEND FEES OR COMPLETED FORMS TO THIS ADDRESS. SEND TO: Commissioner for Patents, P.O. Box 1450, Alexandria, VA 22313-1450.

*If you need assistance in completing the form, call 1-800-PTO-9199 and select option 2.*

FIG. 1B

LEARNING IMAGE ANCHOR TEMPLATES FOR DOCUMENT CLASSIFICATION

BACKGROUND

The present exemplary embodiments disclosed herein relate generally to the classification of documents. They find particular application in conjunction with the generation of image anchor templates used to categorize documents, and will be described with particular reference thereto. However, it is to be appreciated that the present exemplary embodiments are also amenable to other like applications.

When dealing with a large number of documents, it is often desirable to quickly classify the documents. Typical solutions work by matching one or more manually generated image anchor templates to target images corresponding to documents. If the image anchor templates sufficiently match a target image, the classification of the corresponding document is known.

One important aspect of such solutions is that they depend upon the ability of the image anchor templates to discriminate between documents of different classes. Consequently, image anchor templates are chosen for their discriminative power. That is to say, image anchor templates are chosen for their ability to differentiate between documents of different classes.

In choosing image anchor templates, typical solutions rely upon an operator to manually select the image anchor templates to discriminate between target images of a particular class and target images of other classes. Put another way, these solutions rely upon the skill and intuition of an operator to generate the image anchor templates. However, this reliance on an operator may lead to sub-par image anchor templates and/or a waste of time and resources due to the difficulty of picking image anchor templates.

Namely, it is difficult for an operator to predict how a particular image anchor template will match to different target images. Even more, it is difficult for an operator to find image anchor templates that are not likely to match target images of a different class. This is especially true if documents to be considered have fixed and variable parts and/or share parts with documents of other classes. Such is the case in institutional forms, letter heads, invoices, etc. As a result of these difficulties, an operator will generally have to undergo a trial and error process that takes time and resources.

In view of the deficiencies noted above, there exists a need for improved systems and/or methods of generating image anchor templates. The present application contemplates such new and improved systems and/or methods which may be employed to mitigate the above-referenced problems and others.

INCORPORATION BY REFERENCE

U.S. patent application Ser. No. 12/780,387 (U.S. Patent Application Publication No. 2011/0280490) for "Learning image templates for content anchoring and data extraction," by Prateek Sarkar, filed on even date herewith, is hereby incorporated herein by reference in its entirety.

BRIEF DESCRIPTION

According to one aspect of the present application, a method is provided for generating one or more image anchor templates for discriminating between documents of a first class and documents of other classes. The method begins by generating one or more candidate image anchor templates using one or more seed image anchor templates and/or at least one of one or more exemplars of the first class. Quality scores for each of the candidate image anchor templates are then determined using a computer processor and the exemplars of the first class. Based upon these quality scores, the candidate image anchor templates are ranked and one or more of the most highly ranked image anchor templates are selected.

According to another aspect of the present application, a system is provided for generating one or more image anchor templates for discriminating between documents of a first class and documents of other classes. The system includes a generator module, a template scoring module, a ranking module and a selection module. The generator module generates one or more candidate image anchor templates using one or more seed image anchor templates and/or at least one of one or more exemplars of the first class. The template scoring module determines a quality score for each of the candidate image anchor templates using a computer processor and the exemplars of the first class. The ranking module ranks the candidate image anchor templates according to the quality score. The selection module selects a one or more of the most highly ranked image anchor templates.

According to another aspect of the present application, a method is provided for determining whether a document is a member of a first class or a member of other classes. The method begins by generating one or more candidate image anchor templates using one or more seed image anchor templates and/or at least one of one or more exemplars of the first class. Quality scores for each of the candidate image anchor templates are then determined using a computer processor and the exemplars of the first class. Based upon these quality scores, the candidate image anchor templates are ranked and a one or more of the most highly ranked image anchor templates are selected. Once the most highly ranked image anchor templates are selected, the one or more of the most highly ranked image anchor templates are used to determine whether the document is a member of the first class.

BRIEF DESCRIPTION OF THE DRAWINGS

FIGS. 1a and 1b illustrate a template source;

DETAILED DESCRIPTION

Figure 2:
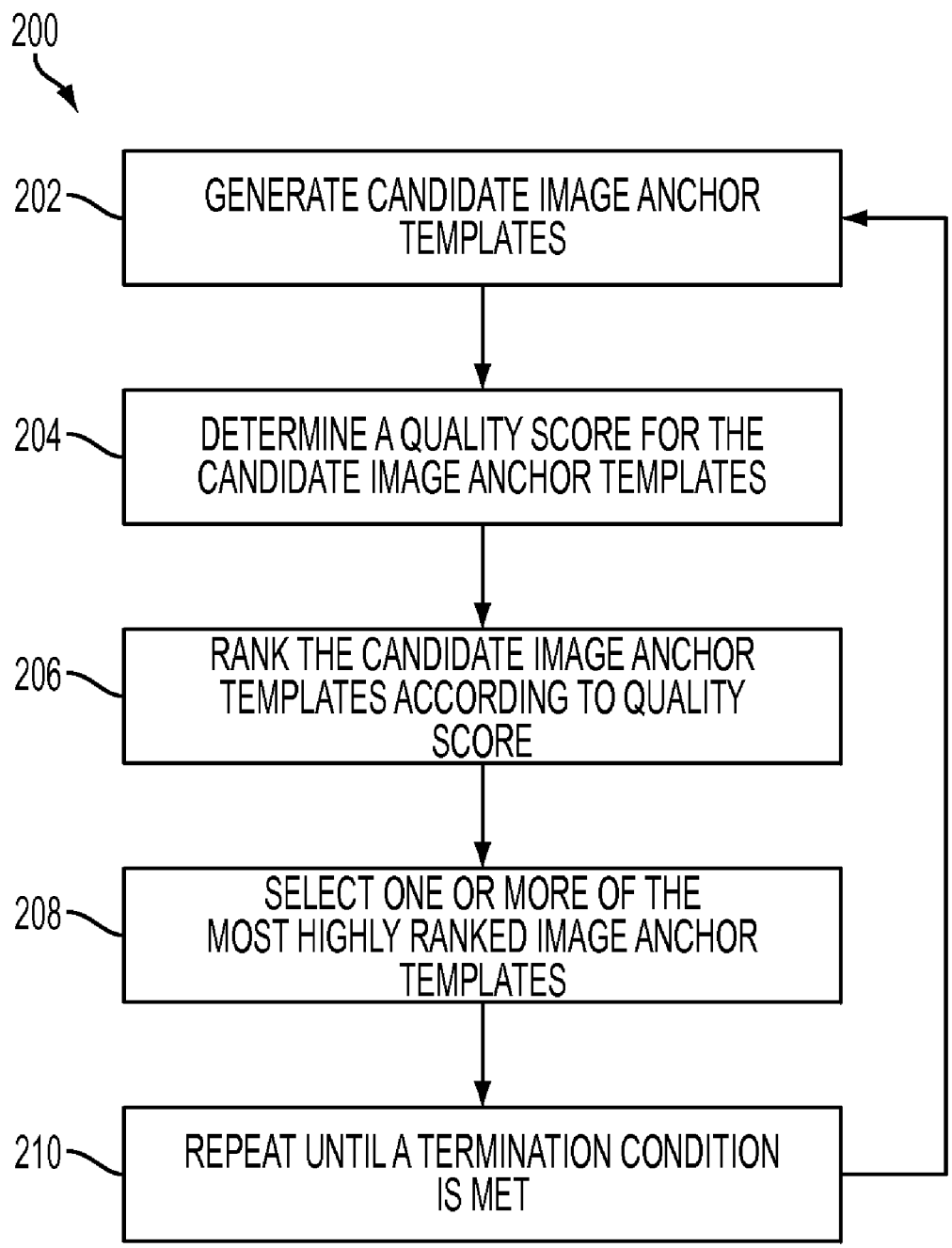
FIG. 2 illustrates a method for generating image anchor templates for discriminating between documents of a first class and documents of other classes.

The systems and methods, discussed in detailed hereafter, pertain to the automatic generation of image anchor templates for discriminating between documents of a first class and documents of other classes. Given at least exemplars (i.e., examples) of the first class, image anchor templates can be generated by generating candidate image anchor templates, determining quality scores for the candidate image anchor templates, ranking the candidate image anchor templates according quality score, and selecting the most highly ranked candidate image anchor templates. However, before discussing the systems and methods in detail, some basic building blocks will be discussed.

An image anchor template t includes an image t.im and a region of interest t.roi. The template image t.im is a sub image $T_a$ of a template source T, $$t.im=T_a$$

, where a denotes the sub-region of the template source T. The sub-region a is specified relative to the coordinates of the template source T and, typically, the sub-region a will be an axes-parallel rectangular region. The region of interest t.roi, in contrast, is specified relative to the coordinates of a target image I. A target image I is an image matched against an image anchor template t.

With reference to FIGS. 1a and 1b, a template source 100 is illustrated. The template source 100, as shown, is an empty form and includes an image anchor template 102. The image anchor template is comprised of a region of interest 104 and an image 106.

A template matching function m(t,I) takes an image anchor template t and a target image I, and explores a set of valid transformations of the template image t.im to find the closest resemblance of the template image t.im within the target image I. Valid transformations are restricted to the template region of interest t.roi and may include at least one of translations of the template image t.im, rotations of the template image t.im, scaling of the t.im, and affine transforms of the t.im. It should be appreciated, however, that other transformations of the template image t.im are equally amenable.

After locating a good resemblance within the target image I, a template matching function generally returns a score in the range of [0, 1], where zero indicates no match and one indicates a perfect match. A perfect match only exists if some sub-region of the target image I exactly matches pixel for pixel the template image t.im under a valid transformation. Further, if an image anchor template t matches multiple locations, the score is discounted by a factor that increases with the number of matches. Thus, the score returned by a template matching function m(t,I) is typically, but not necessarily, a score that represents the "goodness" of the best match found. In certain embodiments, the matching function may also return the valid transformation corresponding to the best match or the best matching sub-image of the target image I.

While any matching function, subject to the restraints noted above, may be used, in certain embodiments, matching functions are based on at least one of basic correlation measures with or without various kinds of normalization, probabilistic likelihoods or likelihood ratios (such as multi-level templates for Document Image Decoding), Hausdorff distance, and comparisons based on local measurement histograms (such as Earth Movers Distance).

When dealing with binary documents, matching functions based on Hausdorff distance are of particular interest because said matching functions are known to be fast and efficient when dealing with binary images. The Hausdorff distance between two images (e.g., a template image and a sub-image of a target image) is defined as the maximum distance between two corresponding foreground points after the template has been transformed by the most favorable valid transform to get the best match scenario.

Rucklidge et al. developed an efficient branch and bound based technique for locating templates in larger images by minimizing the Hausdorff distance between a set of template image points and a set of sub-image points. For more information, attention is directed to Daniel P. Huttenlocher and William J. Rucklidge, "A Multi-Resolution Technique for Comparing Images Using the Hausdorff Distance," Technical Report TR 92-1321, Cornell University, 1992 and William Rucklidge, *Efficient Visual Recognition Using the Hausdorff Distance* (Springer-Verlag New York, Inc. Secaucus, N.J., USA, 1996), both of which are incorporated herein by reference in their entirety.

A template detection function d(t,I) is a Boolean function that returns a one or a zero to indicate if a good match was found, where zero means no match was found. A template detection function may be constructed by comparing the match score of the template matching function to an acceptance threshold q.

$$d(t, I; m, q) = 1 \quad \text{if } m(t, I) > q$$
$$= 0 \quad \text{otherwise}$$

A composite image anchor template C is a collection of image anchor templates $(t_1, t_2, \ldots, t_k)$. Similar to the template matching function described above, a composite template matching function m(C,I) generally returns a score in the range of [0, 1], where the score represents the "goodness" of the match. However, in contrast with the template matching function described above, the composite template matching function considers how each of the image anchor templates match a target image I. A typical composite matching function is obtained by defining a function over the individual template matching functions.

$$m(C,I)=f(m(t_1,I), \ldots, m(t_K,I))$$

Such a function could, for example, consider the maximum, minimum, average, or median of the individual template match scores. More sophisticated composite matching functions may take into account not only the individual match scores, but also corresponding transforms.

A composite template detection function d(C,I), similar to the template detection function described above, returns zero or one (match or no-match). Typically, a composite template detection function is a Boolean combination of the individual template detection functions. However, other methods are equally amenable. For example, one could use a voting scheme or apply a binary document classifier function as a composite detector.

A binary or multicategory document classifier function takes a target image and a collection of image anchor templates, which can discriminate between target images of different classes, and returns a classification. A binary document classifier function simply indicates whether a target image is of a certain classification. A multicategory document classifier function returns the classification of a target image from one of a plurality of known classifications. In certain embodiments, a document classifier function builds upon template matching functions and/or template detection functions by treating the results of the template matching functions and/or the template detection functions as input vectors to a classifier.

For example, if one has an image anchor template known to only match documents of a first class (and not documents of other classes), one can easily construct a document classifier function based upon whether the image anchor template matches a document image. In a more complex case, it may take combinations of image anchor templates to discriminate between documents of different classes. In such cases, a document classifier function simply needs to be able to recognize these combinations from a vector of results from template matching functions and/or template detection functions. Boolean algebra presents a useful tool for dealing with a vector of detection results.

With reference to FIG. 2, a method 200 of determining one or more image anchor templates for discriminating between documents of a first class and documents of other classes is illustrated. The method 200 includes generating candidate image anchor templates (Action 202), determining a quality score for each of the candidate image anchor templates (Action 204), ranking the candidate image anchor templates according to quality score (Action 206), and selecting a one or more of the most highly ranked image anchor templates (Action 208). In certain embodiments, the method 200 further includes repeating actions 202 through 208 until a termination condition is met (Action 210).

To begin, candidate image anchor templates are generated using a candidate image anchor template generator (Action 202). A candidate image anchor template generator generally takes as input an image and/or an image anchor template. In certain embodiments, the image is an exemplar image of the first class or an exemplar image of the other classes. An exemplar image is an image of an example document from a class (e.g., the first class) that is used for training the method 200. Typically, the operator carrying out the method 200 will define the exemplar images. In certain embodiments, an image anchor templates, in addition to taking an image or an image anchor template as input, also takes exemplars of the first class and/or exemplars of the other classes.

Based upon this input, the candidate image anchor template generator generates candidate image anchor templates. In certain embodiments, generating candidate image anchor templates entails extracting sub-images from the input and/or performing any number of valid transformations on the input. Valid transformations include, but are not limited to, translations, rotations, affine transformations, etc. Examples of candidate image anchor template generator include, but are not limited to, a coarse grid sampling generator, a seeded collection generator, and a transitive explorer generator.

The coarse grid sampling generator takes an input image and generates a coarse sampling of image anchor templates from the input image. In other words, the coarse grid sampling generator divides the input image into sub-regions and extracts the sub-regions into image anchor templates. In certain embodiments, image anchor templates whose pixels are almost all white or almost all black are discarded because they're intrinsically understood to have low discriminative power. To control the number of candidate image anchor templates generated by the coarse grid sampling generator, the size of image anchor templates to be extracted from the input image can be varied. Naturally, the smaller the size, the more image anchor templates.

Figure 3A:
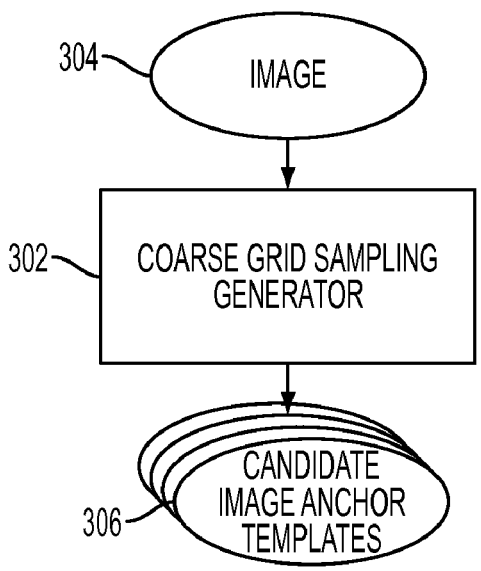
FIG. 3 illustrates the generation of candidate image anchor templates using several different candidate image anchor template generators.

With reference to FIG. 3a, the generation of candidate image anchor templates using the coarse grid sampling generator 302 is illustrated. As can be seen, the coarse grid sampling generator 302 receives an image 304 as input and outputs candidate image anchor templates 306.

The seeded collection generator (also called a perturbation generator) takes an image anchor template as input and generates new image anchor templates by performing valid transformations on the input image anchor template. Valid transformations include, but are not limited to, translations, rotations, affine transformations, etc. Thus, the seeded collection generator generates image anchor templates by exploring minor variations of the input image anchor templates. In certain embodiments, the seeded collection generator may explore variations of the region of interest of the input image anchor template.

Figure 3B:
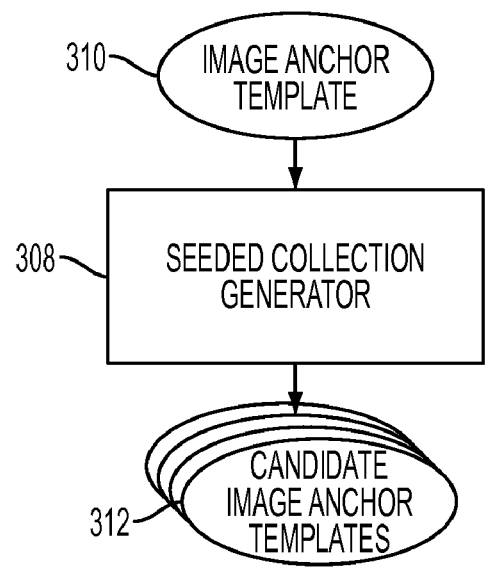

With reference to FIG. 3b, the generation of candidate image anchor templates using the seeded collection generator 308 is illustrated. As can be seen, the seeded collection generator 308 receives an image anchor template 310 as input and outputs candidate image anchor templates 312.

The transitive explorer generator is a special kind of seeded collection generator that takes an image anchor template and exemplars as input and matches the image anchor template against the exemplars, where new image anchor templates are constructed by carving out the matches within the exemplars. In certain embodiments, the transitive explorer generator also explores valid transformations on the input image anchor template, similar to the seeded collection generator. Additionally, in certain embodiments, the transitive explorer generator generates an image anchor template by combining all the matches within the exemplars. In some of these embodiments, this is determined by identifying the most consistent pixels when all the matching locations are overlaid on one another.

Figure 3C:
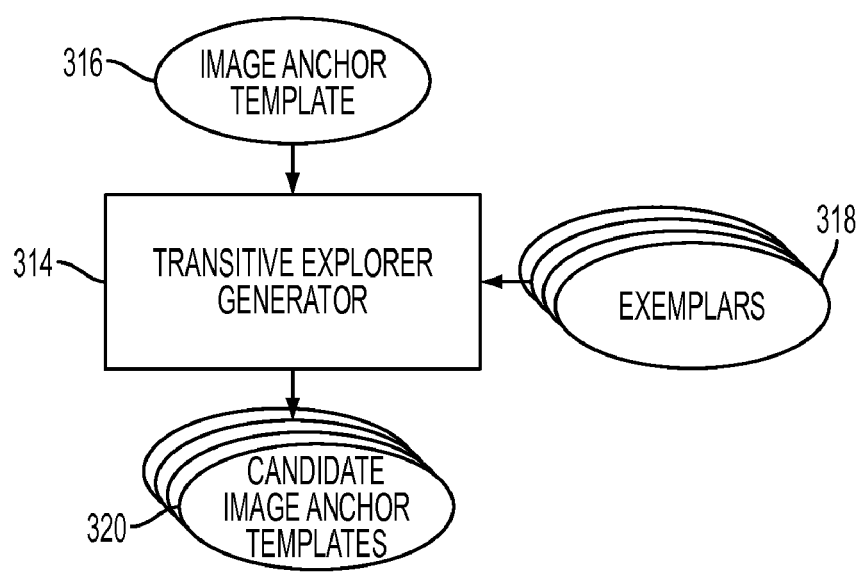

With reference to FIG. 3c, the generation of candidate image anchor templates using the transitive explorer generator 314 is illustrated. As can be seen, the transitive explorer generator 314 receives an image anchor template 316 and exemplars 318 as input. After receiving this input, the transitive explorer generator outputs candidate image anchor templates 320.

Notwithstanding the enumerated image anchor template generators, other kinds of image anchor template generators are equally amenable. Additionally, image anchor template generators can be nested in various configurations to obtain new composite generators. For example, typically the seeded collection generator and/or the transitive explorer generator are used with the coarse grid sampling generator, where image anchor templates generated by the coarse grid sampling generator are used as input to the seeded collection generator and/or the transitive explorer generator.

Referring back to FIG. 2, regardless of how candidate image anchor templates are generated (Action 202), a quality score is determined for each of the candidate image anchor templates using a template scoring function (Action 204). The quality score of an image anchor template is a measure of its discriminative power. In the context of the subject method, the discriminative power of an image anchor template corresponds to the ability of the image anchor template to discriminate between documents of the first class and documents of the other classes.

To facilitate the determination of a quality score, the template scoring function generally takes as input one or more exemplars of the first class (i.e., positive exemplars). In certain embodiments, the template scoring function may further take exemplars of other classes as input (i.e., negative exemplars). Exemplars allow the subject method to empirically determine the ability of image anchor templates to discriminate between documents of the first class and documents of the other classes.

Using the exemplars as input, quality scores may, but need not, be determined using intrinsic image anchor template characteristics and/or image anchor template response on a sample collection of exemplars. Image anchor template response may, for example, include empirical supervised estimates of quality, empirical unsupervised estimates of quality, and empirical one-sided estimates of quality.

A template scoring function using intrinsic template characteristics takes at least an image anchor template as input. It then looks for characteristics of the image anchor template that correspond to approximately known discriminative power. For example, all white or all black image anchor templates aren't likely to be useful, whereby said image anchor templates may be fairly assigned low quality scores. Naturally, the level of resolution of such a template scoring function is limited. However, it provides a quick way to efficiently discard image anchor templates.

A template scoring function using empirical supervised estimates of quality takes at least an image anchor template, positive exemplars images, and negative exemplars as input. It then looks to an image anchor template response on the exemplars. Namely, for an image anchor template t and a matching function m(t,I), the matching scores for all the exemplars (positive and negative) are generated and used to generate a receiver operating characteristic (ROC) curve by varying the acceptance threshold q in a template detection function d(t,I).

Figure 4:
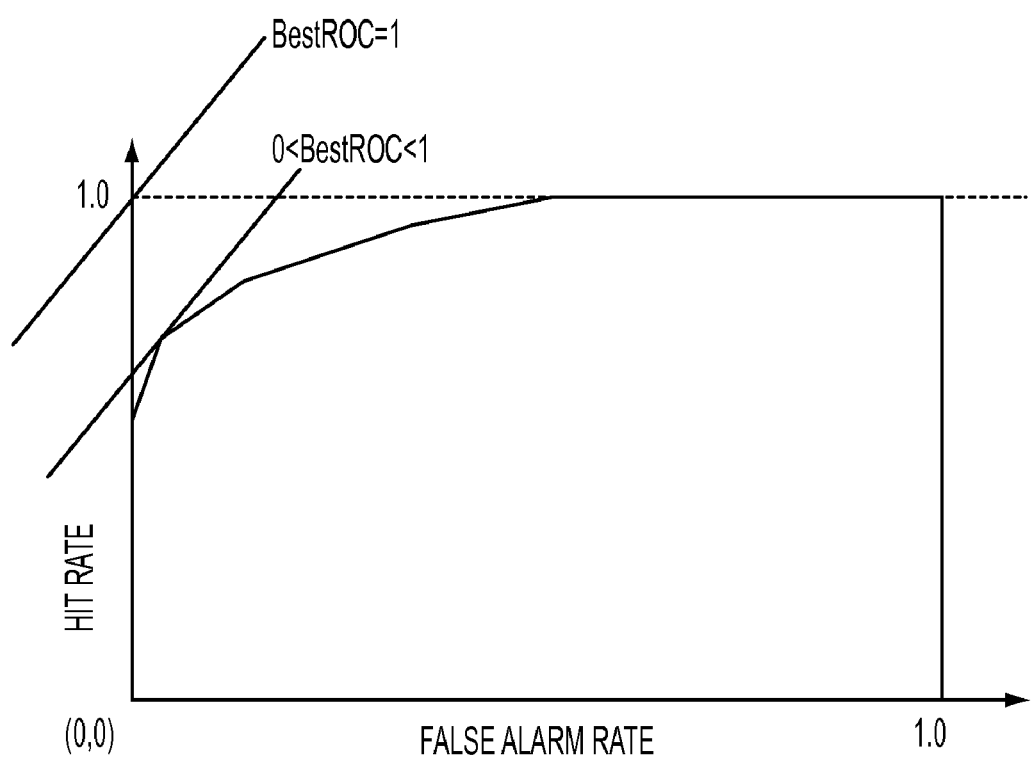
FIG. 4 illustrates an ROC Curve.

An ROC curve is obtained by plotting a hit rate (i.e., the rate of true positives) against a false alarm rate (i.e., the rate of false positives) as the acceptance threshold q is varied. The hit rate for a given acceptance threshold q is simply the rate with which the template detection function d(t,I) correctly classifies an exemplar. Since sets of positive and negative exemplars are known, verification of the template detection function d(t,I) is easily obtained. In a similar manner, the false alarm rate is readily obtained. With reference to FIG. 4, an ROC curve is illustrated.

After generating the ROC curve, a quality score s for an image anchor template can then be calculated as follows, $$s(t;m,\alpha) = \text{bestROC}(t;m,\alpha) + \text{AreaROC}(t;m) + \text{margin}(t;m)$$

The areaROC(t,m,$\alpha$) is simply the area under the ROC curve (i.e., the region under the curve of FIG. 4) and margin(t,m) is the difference between the smallest matching score for a positive exemplar and the largest matching score for a negative exemplar. Further, the bestROC(t,m,$\alpha$) is defined as $$\text{bestROC}(t, m, \alpha) = \max_q (\text{hitRate}(q) - \alpha \cdot \text{falseAlarmRate}(q)),$$

where the hitRate(q) and the falseAlarmRate(q) are substantially as described above and $\alpha$ is a penalty for false alarms. The higher $\alpha$ is, the greater the penalty for false alarms.

A template scoring function using empirical unsupervised estimates of quality looks to an image anchor template response on a sample collection of exemplars. This quality estimate is targeted to situations where there are multiple target categories and the category labels for a collection of exemplars are known, but a determination has not been made as to how to split up the categories. In such a case, a template's quality score is the mutual information between the matching/detection result and the image category label.

A template scoring function using empirical one-sided estimates of quality takes at least an image anchor template and positive exemplars as input. It then looks to an image anchor template response on a sample collection of only the positive exemplars. Namely, the one-sided metric o(t,m) can be defined as $$o(t; m) = \sum_{I \in \text{positive exemplars}} \text{prob}(\text{positive category} \mid m(t, I)),$$

where each probability on the right-hand side can be computed using Bayes' rule with equal priors starting from the following formula.

$$\text{prob}(m(t,I) \mid \text{positive category}) \propto e^{-\lambda_{pos} \cdot m(t,I)}$$

$$\text{prob}(m(t,I) \mid \text{negative category}) \propto e^{-\lambda_{neg}(1-m(t,I))}$$

As should be appreciated, the parameters $\lambda$ can be trained. However, due to space considerations, in certain embodiments $\lambda_{pos}$ and $\lambda_{neg}$ are set to one, thereby giving the negative category a flatter distribution.

Notwithstanding the enumerated template scoring functions, it should be appreciated that other template scoring functions are equally amenable. For example, composite template scoring functions building on the template scoring functions enumerated above and/or other template scoring functions may be used. Additionally, while the template scoring functions discussed above were defined for single image anchor templates, it should be appreciated that the template scoring functions may be used for composite templates.

Once quality scores for the candidate image anchor templates are generated (Action 204), the candidate image anchor templates are ranked according to the quality scores (Action 206) and one or more of the most highly ranked candidate image anchor templates are selected (Action 208). In certain embodiments, the operator manually defines the number of image anchor templates to be selected. In other embodiments, the number of image anchor templates to be selected is dynamically set to the level that achieves full coverage of all the exemplars of the first class (i.e., the positive exemplars). Full coverage refers to the ability to discriminate between all the exemplars of the first class and the exemplars of other classes.

Figure 5:
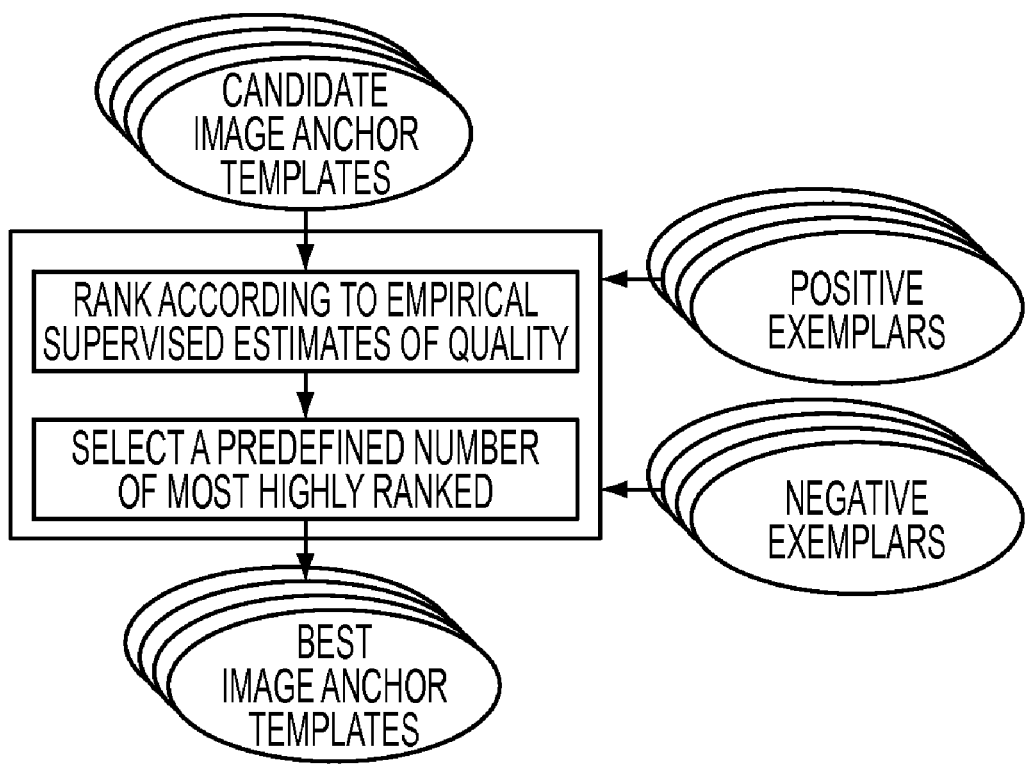
FIG. 5 illustrates the generation of image anchor templates according to an embodiment of the method of FIG. 2.

In certain embodiments, the method 200 is complete at this point. In such embodiments, the selected image anchor templates are the best image anchor templates found for discriminating between documents of the first class and documents of other classes. Along these lines, with reference to FIG. 5, the generation of image anchor templates according to a specific embodiment of the method of FIG. 2 is illustrated. Candidate image anchor templates 502 are ranked 504 using empirical supervised estimates of quality, which require positive exemplars 506 and negative exemplars 508. Thereafter, a predefined number of the most highly ranked image anchor templates are selected 510, where these selected image anchor templates represent the best image anchor templates 512 generated.

In other embodiments, however, the method 200 may continue on. Namely, as noted above, after the most highly ranked image anchor templates are selected the method 200 may optionally repeat, subject to the conditions noted below, Actions 202 through 208 until a termination condition is met (Action 210). Under these embodiments, iterations may vary from iteration to iteration. For example, the image anchor template functions and/or the template scoring functions may vary.

With respect to the termination condition, in certain embodiments, the termination condition is an elapsed run time and/or run a predefined number of iterations. For example, the method 200 may run for five seconds before terminating. In other embodiments, the termination condition is whether the selected image anchor templates cover all the exemplars of the first class. In other words, whether the selected image anchor templates are able to discriminate between all the exemplars of the first class and the exemplars of other classes.

Under the latter termination condition, if there are exemplars of the first class which are not covered by the selected image anchor templates, those exemplars may be used for generating image anchor templates in the next iteration. For example, the exemplars which are not covered may be used as input into the coarse grid sampling generator. Alternatively, or in addition, image anchor templates derived from the exemplars of the first class not covered may be used as input to the seeded collection generator and/or the transitive explorer generator, whereby these image anchor templates act as seed image anchor templates.

Notwithstanding the exemplary termination conditions noted above, it should be appreciated that other termination conditions are equally amenable and a termination condition may be a composite of individual termination conditions. For example, a termination condition may use both elapsed time and whether the selected image anchor templates are able to discriminate between all the exemplars of the first class and the exemplars of other classes.

With respect to repeating, Actions 202 through 208 are repeated substantially as described above. One notable exception to this, however, is that new candidate image anchor templates are ranked with the image anchor templates previously selected. In other words, the best image anchor templates from the previous iteration are ranked together with the newly generated candidate image anchor templates from the current iteration. Additionally, as suggested above, one or more of the most highly ranked candidate image anchor templates from the previous iteration may be used as input for the generation of new candidate image anchor templates at Action 202.

To illustrate, an iterative example of the method is as follows. Using the coarse grid sampling generator, an initial set of candidate image anchor templates are generated from an exemplar of the first category. The quality scores for these candidate image anchor templates are then determined and the candidate image anchor templates are ranked. From this ranking the top two hundred image anchor templates are selected. Assuming the termination condition is not met (e.g., the elapsed time has not run), the selected image anchor templates are used to generate additional image anchor templates with the seeded collection generator and/or the transitive explorer generator. The quality scores for these newly generated image anchor templates are then generated and the newly generated image anchor templates are ranked with the previously selected image anchor templates. From this ranking the top two hundred image anchor templates are selected. Assuming the termination condition is met, these top two hundred image anchor templates represent the end result of the method.

In order to improve the performance of the method 200 described above, a number of options are available. Examples include, but are not limited to, adjusting the coarseness of the grid sampling generator, working on images subsampled by a factor of two, capping the maximum number of image anchor templates that will be tested against negative exemplars, reducing the region within which image anchor templates are searched, reducing the number of exemplars (positive and/or negative) that will be tested, altering the parameters of the matching function (e.g., Hausdorf matching).

With respect to reducing the region within which image anchor templates are searched, at least two methodologies include a method based upon intrinsic template characteristics and a histogram based method. Intrinsically, it may be clear from the exemplars of the first class that only certain areas of the exemplars are likely to yield useful image anchor templates. Accordingly, the search for image anchor templates can be limited by, for example, limiting the search for image anchor templates to the upper and/or lower halves of the exemplars. Alternatively, or in addition, a more sophisticated method for limiting the region within which image anchor templates are searched is to use a histogram based approach.

According to the histogram based approach, after examining the first few hundred template matches on a one target image, there are enough clues to guess the possible displacements at which to find other template matches. For example, suppose there are a few thousand image anchor templates to match against a positive exemplar image. By initially searching for image anchor template matches over a large space of possible displacements and continually populating a histogram over displacements at which matches are found, after a few matches (say a hundred) the smallest bounding rectangle that contains 95% or more of the matches so far can be identified. The remaining templates can then be matched only within this tighter rectangle of relative displacements.

Regardless of whether any optimizations are used, once the method 200 is complete, one can easily use the image anchor templates generated using the method 200 to construct a binary or multicategory document classifier function for the first category, as described above. Namely, once the method 200 has run, one will have a collection of image anchor templates sufficient to discriminate between image anchor templates of the first class and image anchor templates of the other classes. Thus, determining whether a document falls within the first class is a simple matter of determining whether the document sufficiently matches the determined image anchor templates.

Having discussed the method 200, it is to be appreciated that in certain embodiments the method 200 may be used with composite image anchor templates. Additionally, operator input may be used at any of the Actions noted above. For example, when performing an iterative variant of the method 200, the operator may provide input to control how candidate image anchor templates are generated for each iteration.

Figure 6:
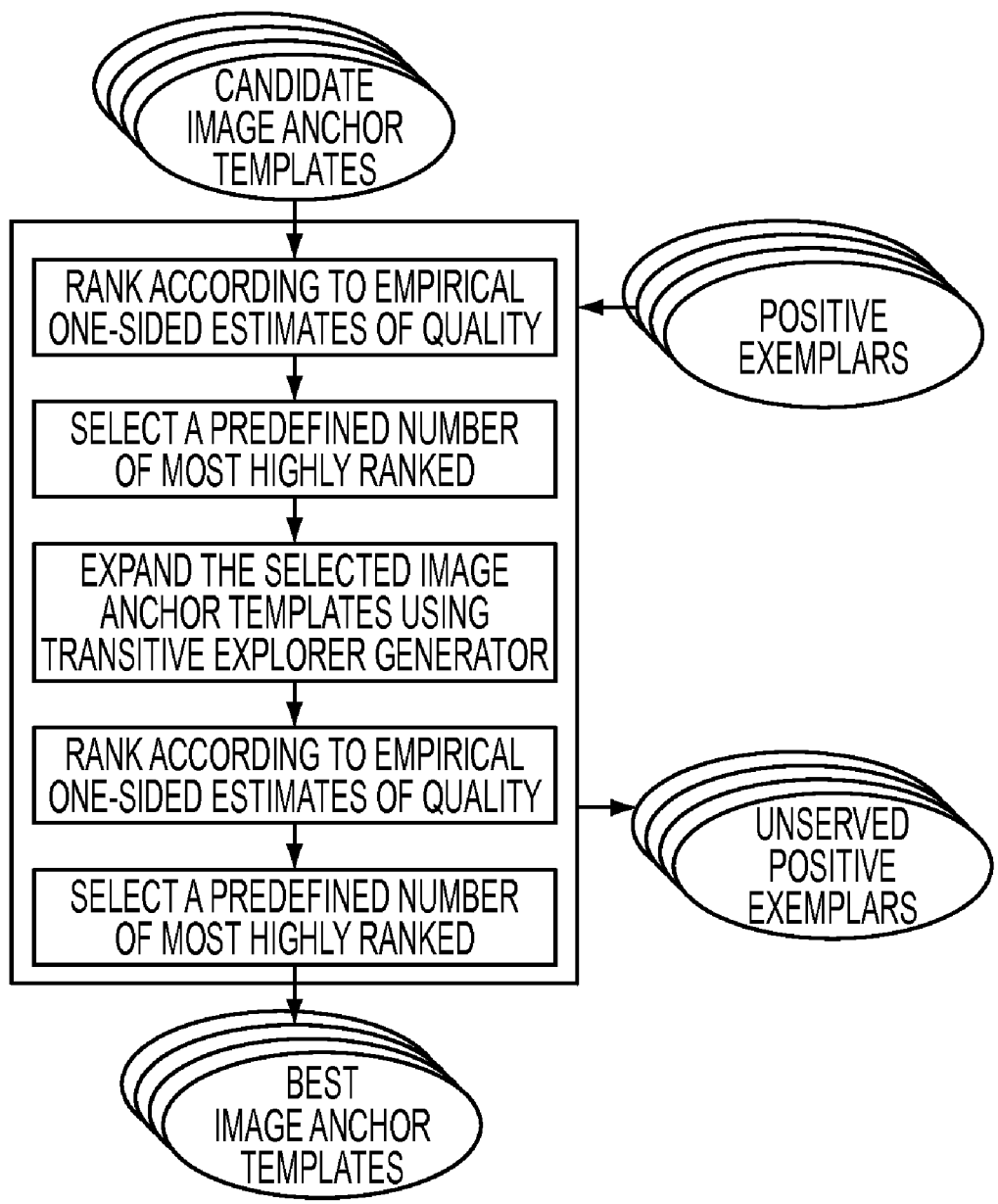
FIG. 6 illustrates the generation of image anchor templates according to an embodiment of the method of FIG. 2.

For example, with reference to FIG. 6, the generation of image anchor templates according to an iterative embodiment of the method of FIG. 2 is illustrated. Candidate image anchor templates 602 are ranked 604 using empirical one-sided estimates of quality, which require positive exemplars 606. Thereafter, a predefined number of the most highly ranked image anchor templates are selected 608 and expanded 610 using the transitive explorer generator. This expanded set of image anchor templates includes the selected image anchor templates and the image anchor templates generated by the transitive explorer generator. The expanded set of image anchor templates is then ranked 612 using empirical one-sided estimates of quality and a predefined number of the most highly ranked image anchor templates are selected 614, where these image anchor templates correspond to the best image anchor templates 616 generated.

As noted, FIG. 6 can be characterized as an iterative variant of the method 200 of FIG. 2. Namely, the expansion noted above can be characterized as the generation of image anchor templates using the selected image anchor templates from the previous iteration, whereby the selected image anchor templates act as seeds for the transitive explorer generator. Additionally, the unserved positive exemplars 618 are merely the exemplars of the first class not covered by the best image anchor templates 616. As noted above, these exemplars may be used for the generation of additional image anchor templates in subsequent iterations.

Figure 7:
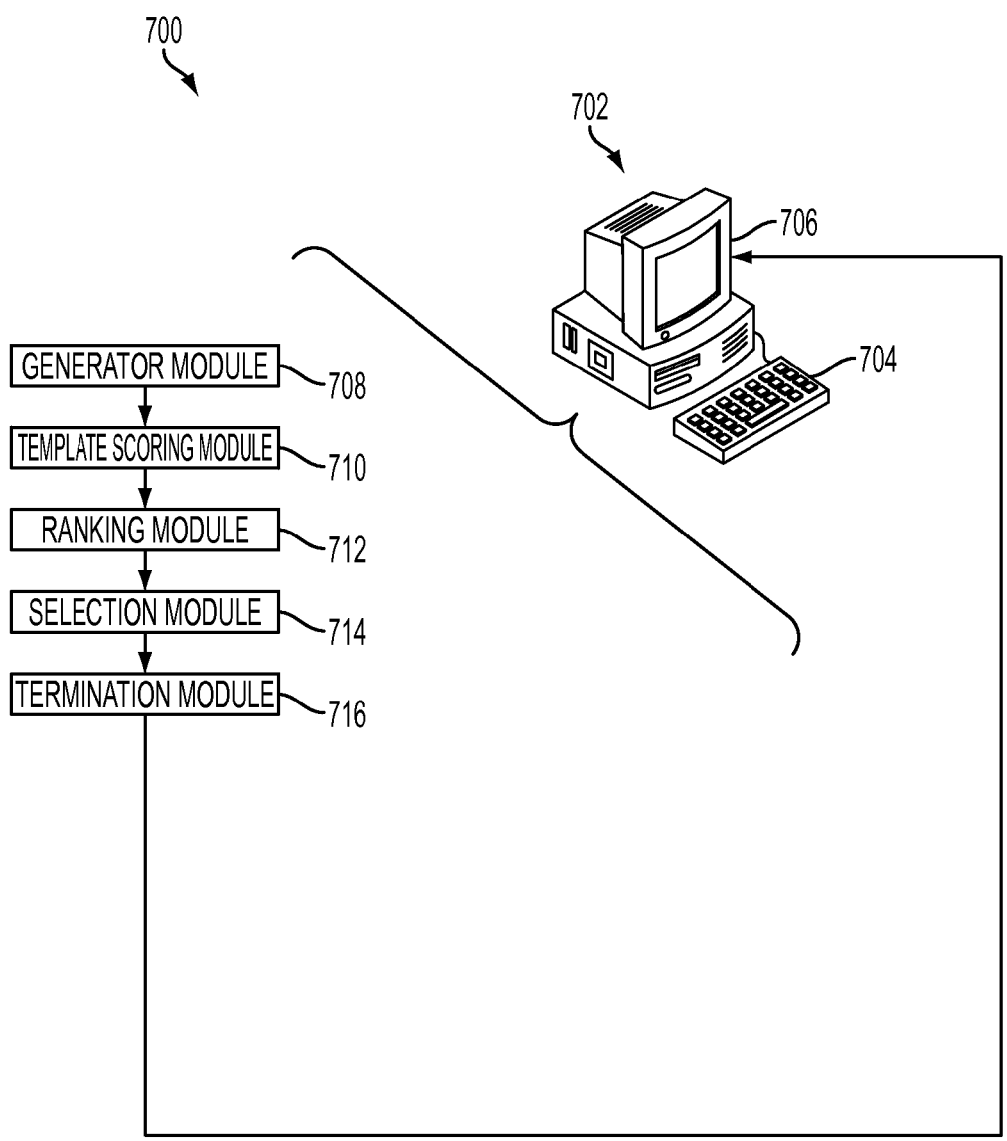
FIG. 7 illustrates an image anchor template generator employing the method of FIG. 2.

With reference to FIG. 7, an image anchor template (IAT) generator 700 employing the method of FIG. 2 is illustrated. A computer 702 or other digital processing device, including storage and a digital processor, such as a microprocessor, microcontroller, graphic processing unit (GPU), etc., suitably embodies the IAT generator 700. In other embodiments, the IAT generator 700 is embodied by a server including a digital processor and including or having access to digital data storage, such server being suitably accessed via the Internet or a local area network, or by a personal data assistant (PDA) including a digital processor and digital data storage, or so forth.

The computer or other digital processing device suitably includes or is operatively connected with one or more user input devices such as an illustrated keyboard 704 for receiving user input to control the IAT generator 700, and further includes or is operatively connected with one or more display devices such as an illustrated display 706 for displaying output generated based on the output of the IAT generator 700. In other embodiments, the input for controlling the IAT generator 700 is received from another program running previously to or concurrently with the IAT generator 700 on the computer 702, or from a network connection, or so forth. Similarly, in other embodiments the output may serve as input to another program running subsequent to or concurrently with the IAT generator 700 on the computer, or may be transmitted via a network connection, or so forth.

The IAT generator 700 includes a generator module 708, a template scoring module 710, a ranking module 712 and a selection module 714. In certain embodiments where the system supports iterative variants of the method of FIG. 2, the system further includes a termination module 716.

The generator module 708 receives an image or an image anchor template as input and generates candidate image anchor templates therefrom. In certain embodiments, the generator module 708 receives input from a source external to the IAT generator 700. The source may be, for example, a database, another program, the operator, etc. Under such embodiments, the generator module 708 generally receives one or more exemplars of the first class, which are used with the coarse grid sampling generator to generate image anchor templates. In other embodiments, the generator module 708 receives input from the termination module 716. Under such embodiments, the generator module 708 generally receives one or more image anchor templates, which are used with the seeded collection generator and/or transitive explorer generator. The generator module 708 preferably generates candidate image anchor templates as described in connection with Action 202 of FIG. 2.

The template scoring module 710 receives the candidate image anchor templates from the generator module 708 and determines quality scores for each of the candidate image anchor templates. In certain embodiments, the template scoring module 710 further receives exemplar images from the first class and/or exemplar images from the other classes from a source external to the IAT generator 700 and/or the generator module 708. For example, if the template scoring module 710 is using empirical one-sided estimates of quality it will receive positive exemplars for the first class. Similar to the generator module 708, the template scoring module preferably generates quality scores as described in connection with Action 204 of FIG. 2.

The ranking module 712 next receives the candidate image anchor templates, and corresponding quality scores, and ranks the candidate image anchor templates according to the quality scores. As will be noted below, in certain embodiments, the ranking module 712 also receives image anchor templates from previous iterations and ranks these image anchor templates with the image anchor templates received from the template scoring module 710. Preferably, the ranking module 712 acts as described in connection with Action 206 of FIG. 2.

The selection module 714 then uses these ranked candidate image anchor templates to select one or more of the most highly ranked image anchor templates. For example, the selection module 714 may select the two hundred most highly ranked image anchor templates. Preferably, the selection module 714 acts as described in connection with Action 208 of FIG. 2.

In some embodiments, IAT generator 700 further includes a termination module 716, as noted above, whereby the IAT generator 700 behaves iteratively to generate image anchor templates. In such embodiments, the termination module 716 determines whether a termination condition is met. If the termination condition is not met, the termination module 716 coordinates with the generator module 708 to generate a new set of image anchor templates, which are then scored by the template scoring module 710 and ranked with previously selected image anchor templates by the ranking module 712. A new set of image anchor templates are then selected by the selection module 714 and the termination module 716 again determines whether to terminate. The termination module 716 preferably acts as described in connection with Action 210 of FIG. 2.

If the termination condition is met or the IAT generator 700 lacks a termination module 716, the selected image anchor templates from the selection module 714 are then output for display, printout and/or implemented into additional decision making mechanisms, such as document classification. With respect to document classification, the image anchor templates may be used to generate document classifier functions, as noted above. Thereafter, documents can be quickly classified by passing document images to the document classifier.

Figure 8:
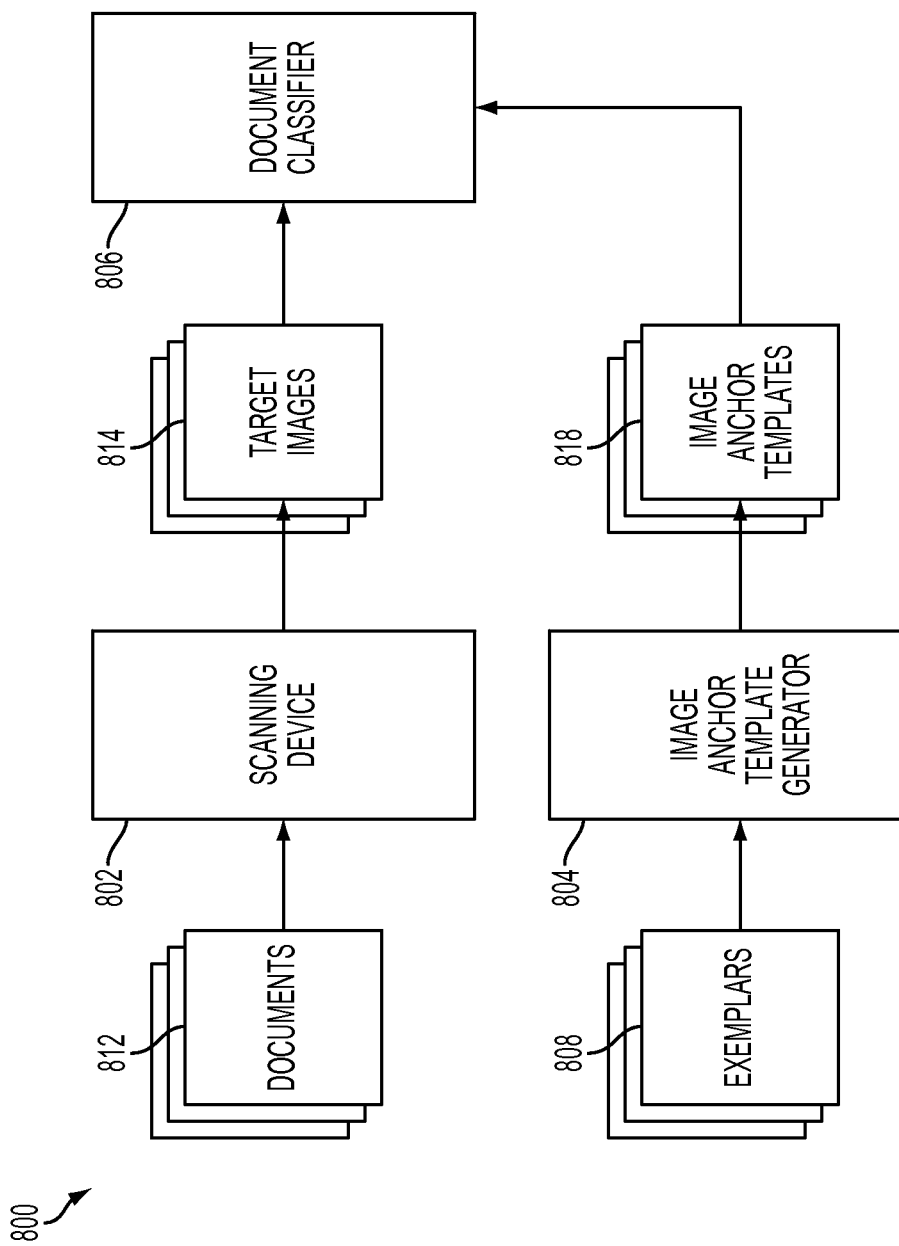
FIG. 8 illustrates the use of a document classification system having the image anchor template generator of FIG. 7.

With reference to FIG. 8, the use of a document classification system 800 is illustrated. The system 800 includes an imaging device 802, an image anchor template generator 804 and a document classifier 806. The imaging device 802 converts a document, such as a form, into a target image and may be a camera, scanner, or other like device. The image anchor template generator 804 is as described in FIG. 7, unless noted otherwise. The document classifier 806 classifies a target image of a document using image anchor templates.

Before the classification of documents can begin, exemplars 808 are provided to the image anchor template generator 804. At a minimum, positive exemplars are provided to the image anchor template generator 804. However, depending upon the image anchor template scoring function used, negative exemplars may also be provided to the image anchor template generator. In certain embodiments, the operator of the system 800 manually classifies the exemplars 808. Thereafter, the image anchor template generator 804 takes the exemplars 808 and generates image anchor templates 810, as discussed in connection with FIG. 7.

After the image anchor templates are generated 810, the system 800 begins classifying documents. Namely, the scanning device 802 receives one or more documents 812 and converts them to target images 814. In certain embodiments, the documents 812 are loaded into a feed tray of a printing device and passed through the imaging device 802 via a conveyor path.

The target images 814 are then passed to the document classifier 806 and the document classifier 806 uses the image anchor templates 810 from the image anchor template generator 804 to classify the target images 814. The target images 814 may be passed to the document classifier 806 contemporaneously with the conversion of the documents 812 or after all the documents 812 are converted. In certain embodiments, as noted above, the document classifier 806 uses the image anchor templates 810 as input to a binary or multicategory document classifier function.

Once the document classifier 806 classifies the documents 812, the documents 812 and/or the target images 814 are processed as necessary. For example, the documents 812 may be routed via conveyer paths to a destination based upon their classification. Alternatively, or in addition, the target images 812 may be stored in a database and/or stored within a file system according to their classification.

In view of the discussion heretofore, in some embodiments, the exemplary methods, the IAT generator employing the same, and so forth, of the present invention are embodied by a storage medium storing instructions executable (for example, by a digital processor) to implement the determination of image anchor templates. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Further, it will be appreciated that various of the above-disclosed and other features and functions, or alternatives thereof, may be desirably combined into many other different systems or applications. For example, while the foregoing systems and methods concerned the generation of image anchor templates, it is to be appreciated that the methods and systems described above can be easily extended to determine matching functions, detection functions, template scoring functions, etc., as opposed to image anchor templates. Also that various presently unforeseen or unanticipated alternatives, modifications, variations or improvements therein may be subsequently made by those skilled in the art which are also intended to be encompassed by the following claims.

What is claimed is:

1. A method of generating one or more image anchor templates for discriminating between documents of a first class and documents of other classes, said method comprising:
    a) generating one or more candidate image anchor templates using one or more seed image anchor templates and/or at least one of one or more exemplars of the first class;
    b) determining a quality score for each of the one or more candidate image anchor templates using a computer processor and the one or more exemplars of the first class;
    c) ranking the one or more candidate image anchor templates according to quality score; and
    d) selecting one or more of the most highly ranked image anchor templates.

2. The method of claim 1, wherein the one or more generated image anchor templates are composite image anchor templates.

3. The method of claim 1, wherein the generating includes using a grid sampling generator on the at least one of the one or more exemplars of the first class.

4. The method of claim 1, wherein the generating includes using a perturbation generator and/or a transitive explorer generator on at least one of the one or more candidate image anchor templates.

5. The method of claim 1, wherein the quality score for the each of the one or more candidate image anchor templates is determined using Hausdorff distance.

6. The method of claim 1, wherein the quality score for the each of the one or more candidate image anchor templates is determined using a receiver operating characteristic curve.

7. The method of claim 1, wherein the quality score for the each of the one or more candidate image anchor templates is determined using exemplars of the first class and exemplars of the other classes.

8. The method of claim 1, wherein the quality score for the each of the one or more candidate image anchor templates is based upon quality of matches between the each of the one or more candidate image anchor templates and the one or more exemplars of the first class.

9. The method of claim 8, wherein the matches between the each of the one or more generated image anchor templates and the one or more exemplars of the first class are limited to one or more portions of the one or more exemplars of the first class.

10. The method of claim 1, wherein the one or more image anchor templates for discriminating between documents of the first class and documents of the other classes include the one or more of the most highly ranked image anchor templates.

11. The method of claim 1, further comprising:
    e) repeating actions a) through d) until the termination condition is met, wherein the one or more candidate image anchor templates are ranked with the one or more of the most highly ranked image anchor templates previously selected.

12. The method of claim 11, wherein the termination condition is an elapsed amount of time.

13. The method of claim 11, wherein the one or more seed image anchor templates include at least one of the one or more of the most highly ranked image anchor templates.

14. The method of claim 11, wherein the termination condition is whether the one or more of the most highly ranked image anchor templates cover the exemplars of the first category.

15. The method of claim 11, wherein the generating includes using the exemplars of the first class which are not covered by the one or more of the most highly ranked image anchor templates previously selected.

16. The method of claim 1, further comprising:
    e) generating one or more expanded candidate image anchor templates using at least one of the one or more of the most highly ranked image anchor templates;
    f) determining a quality score for each of the one or more expanded candidate image anchor templates using a computer processor and the one or more exemplars of the first class;
    g) ranking the one or more expanded candidate image anchor templates with the one or more of the most highly ranked image anchor templates according to quality score; and
    h) selecting one or more of the most highly ranked image anchor templates from g).

17. A system for generating one or more image anchor templates for discriminating between documents of a first class and documents of other classes, said system comprising:
    a generator module that generates one or more candidate image anchor templates using one or more seed image anchor templates and/or at least one of one or more exemplars of the first class;
    a template scoring module that determines a quality score for each of the one or more candidate image anchor templates using a computer processor and the one or more exemplars of the first class;

a ranking module that ranks the one or more candidate image anchor emplates according to quality;

a selection module that selects one or more of the most highly ranked image anchor templates.

18. The system of claim 17, wherein the one or more generated image anchor templates are composite image anchor templates.

19. The system of claim 17, wherein the generator module uses at least one of a grid sampling generator, a perturbation generator and a transitive explorer generator.

20. A method for determining whether a document is a member of a first class or a member of other classes, said method comprising:

a) generating one or more candidate image anchor templates using one or more seed image anchor templates and/or at least one of one or more exemplars of the first class;

b) determining a quality score for each of the one or more candidate image anchor templates using a computer processor and the one or more exemplars of the first class;

c) ranking the one or more candidate image anchor templates according to quality score;

d) selecting one or more of the most highly ranked image anchor templates; and e) determining whether the one or more of the most highly ranked image anchor templates identify the document as a member of the first class.

* * * * *